(12) United States Patent
Downing

(10) Patent No.: US 9,545,868 B1
(45) Date of Patent: Jan. 17, 2017

(54) APPARATUS AND METHOD FOR LOADING, HANDLING AND TRANSPORTING WASTE CONTAINERS

(71) Applicant: Galbreath LLC, Winamac, IN (US)

(72) Inventor: John J. Downing, Winamac, IN (US)

(73) Assignee: GALBREATH LLC, Charlotte, NC (US)

( * ) Notice: Subject to any disclaimer, the term of this patent is extended or adjusted under 35 U.S.C. 154(b) by 632 days.

(21) Appl. No.: 13/965,792

(22) Filed: Aug. 13, 2013

Related U.S. Application Data

(63) Continuation of application No. 12/718,921, filed on Mar. 5, 2010, now abandoned.

(60) Provisional application No. 61/233,489, filed on Aug. 12, 2009.

(51) Int. Cl.
*B60P 1/48* (2006.01)

(52) U.S. Cl.
CPC ........................................ *B60P 1/48* (2013.01)

(58) Field of Classification Search
CPC .................................. B60P 1/48; B60P 1/483
See application file for complete search history.

(56) References Cited

U.S. PATENT DOCUMENTS

| | | | | |
|---|---|---|---|---|
| 3,335,879 A * | 8/1967 | Shaffer | ...................... | B66F 9/10 414/541 |
| 4,132,325 A * | 1/1979 | Corompt | ............... | B60P 1/6463 280/43.24 |
| 4,278,390 A * | 7/1981 | Ahearn | ................... | B66F 9/065 414/549 |
| 4,325,666 A * | 4/1982 | Chain | .................. | A01D 87/127 414/24.5 |
| 4,363,409 A * | 12/1982 | Laurich-Trost | .......... | B63H 1/04 212/300 |
| 4,583,907 A * | 4/1986 | Wimberley | ............. | B66F 9/065 414/685 |
| 4,778,327 A * | 10/1988 | Tufenkian | ................. | B66F 9/06 414/471 |
| 5,007,792 A * | 4/1991 | Wiedeck | ................... | B60P 1/48 414/494 |
| 5,186,598 A * | 2/1993 | Lambert | ............... | B60P 1/6463 414/498 |
| 5,290,138 A * | 3/1994 | Smart | ................... | B60P 1/6463 414/491 |
| 5,542,807 A * | 8/1996 | Kruzick | ................ | B60P 1/6463 414/491 |

(Continued)

*Primary Examiner* — Jonathan Snelting
(74) *Attorney, Agent, or Firm* — Nelson Mullins Riley & Scarborough LLP

(57) ABSTRACT

An apparatus for loading, handling and transporting waste containers includes a vehicle having a main frame and a load container handler, the load container handler including a main frame assembly having a rear and mounted to and atop the vehicle main frame; a pivot assembly pivotally connected to the main frame assembly to rotate about a first axis; a main jib assembly connected with the pivot assembly to reciprocate along a first line between jib extended and retracted positions; a carriage assembly connected with the main jib assembly to reciprocate along a second line between carriage extended and retracted positions and including container connection elements operable to rotate about a second axis and for engaging with and holding a container; and, motive elements for moving the pivot assembly, main jib assembly and carriage assembly.

17 Claims, 13 Drawing Sheets

(56) References Cited

U.S. PATENT DOCUMENTS

| | | | | |
|---|---|---|---|---|
| 5,601,393 | A | * | 2/1997 | Waldschmitt ............. B60P 1/16 |
| | | | | 414/471 |
| 5,651,657 | A | * | 7/1997 | Poindexter ............ B60P 1/4442 |
| | | | | 187/222 |
| 6,019,567 | A | * | 2/2000 | Lutkus .................... B60P 1/003 |
| | | | | 414/501 |
| 6,234,741 | B1 | * | 5/2001 | McDaniel ................. B60P 1/00 |
| | | | | 254/10 R |
| 6,705,823 | B2 | * | 3/2004 | Bohata ................... B60P 1/6463 |
| | | | | 414/491 |
| 6,749,389 | B1 | * | 6/2004 | Vlaanderen ........... B60P 1/6463 |
| | | | | 414/491 |
| 7,074,004 | B2 | * | 7/2006 | Lockamy ............... B60P 1/6427 |
| | | | | 414/549 |
| 7,232,285 | B1 | * | 6/2007 | Ruch .................... B60P 1/4421 |
| | | | | 254/10 R |
| 7,270,511 | B2 | * | 9/2007 | Lockamy .............. B60P 1/6427 |
| | | | | 414/498 |
| 7,293,607 | B2 | * | 11/2007 | Lambert ................. B66F 11/04 |
| | | | | 166/75.11 |
| 7,341,419 | B1 | * | 3/2008 | Fink ...................... B60P 1/6463 |
| | | | | 414/448 |
| 7,351,027 | B2 | * | 4/2008 | Ruch .................... B60P 1/4421 |
| | | | | 414/540 |
| 2007/0212205 | A1 | * | 9/2007 | Lowecki ............... B60P 1/6463 |
| | | | | 414/498 |

* cited by examiner

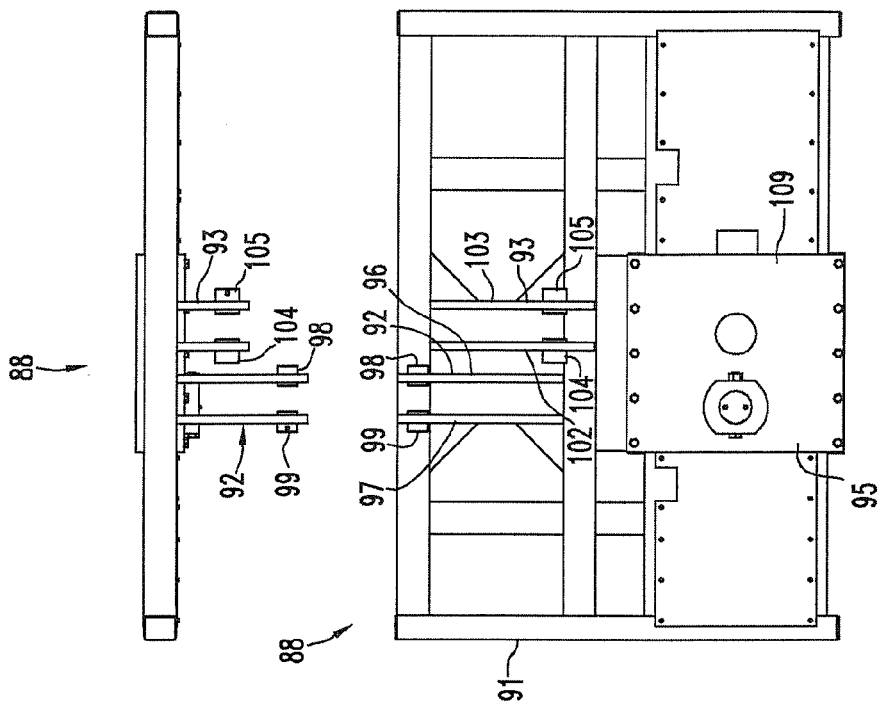
*Fig. 10*
*Fig. 11*
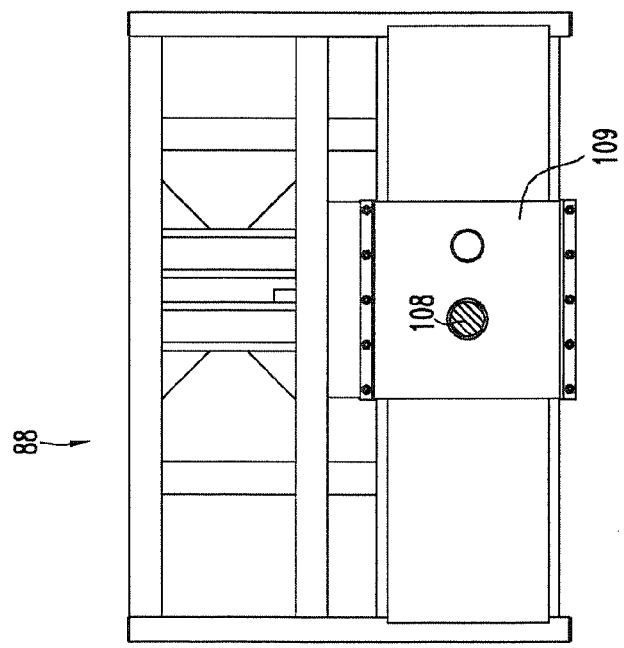
*Fig. 9*

TRAVEL POSITION

RETRACTED HORT. JIB

RAISED
VERT. JIB

LOAD/UNLOAD
POSITION

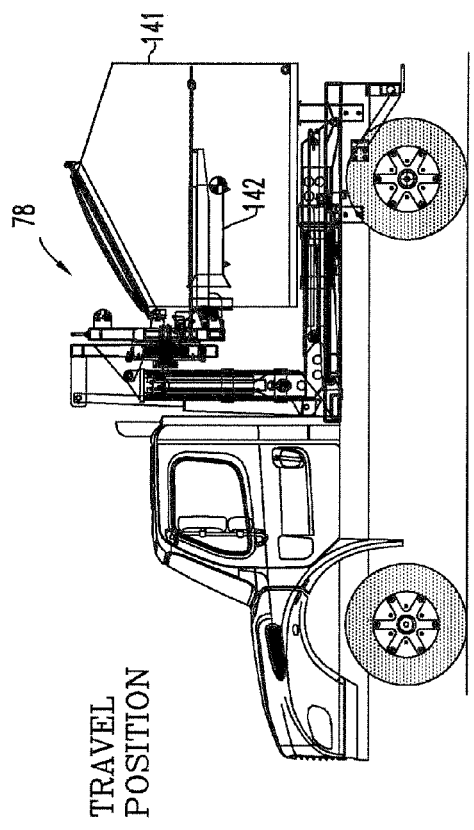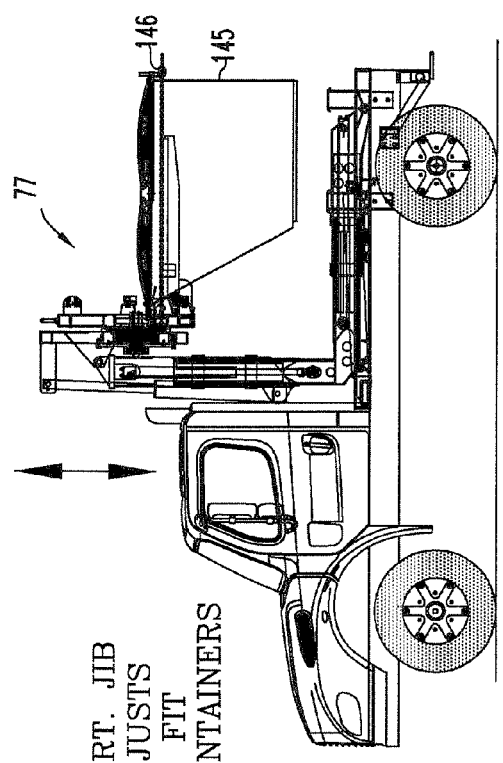

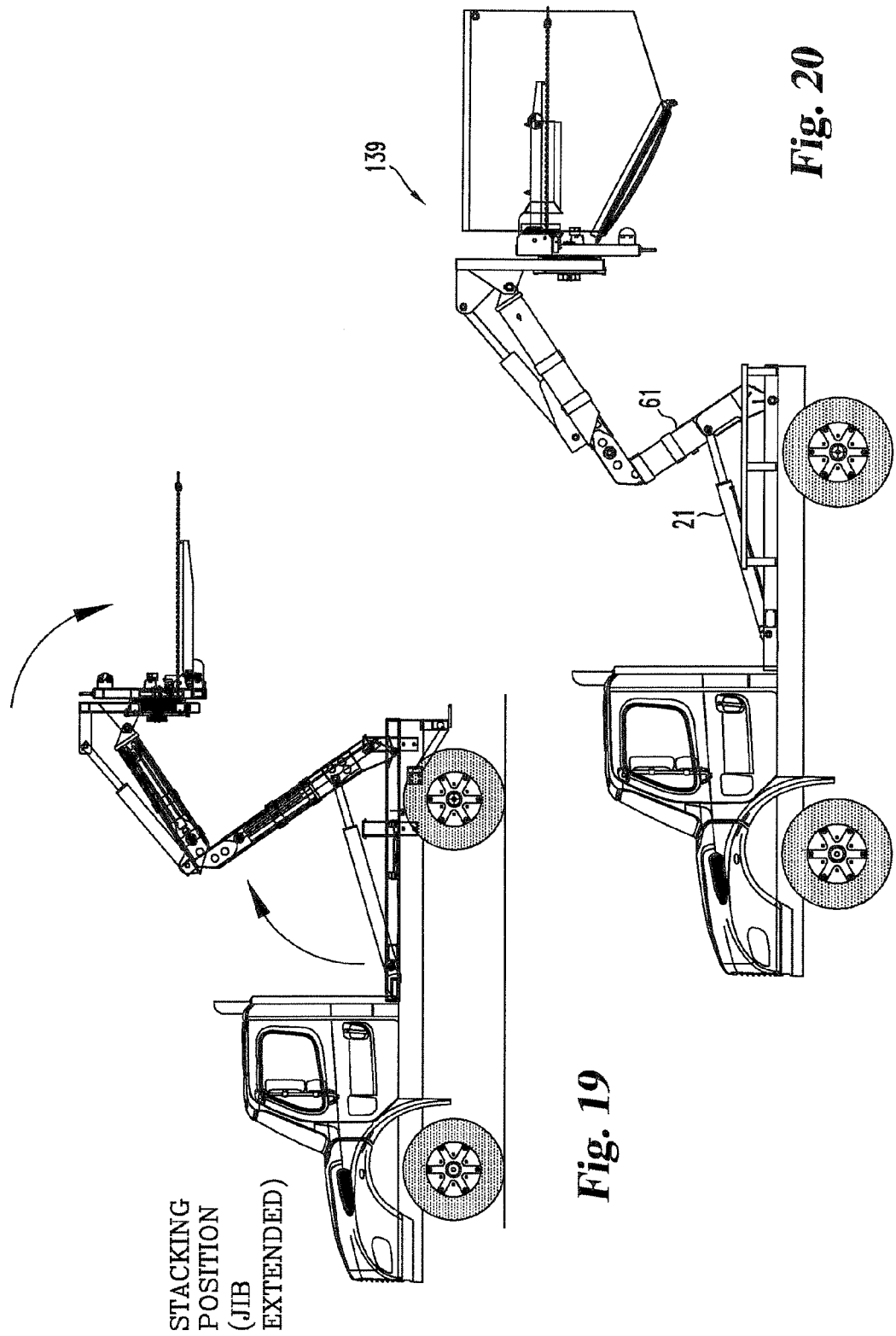

LOAD/UNLOAD POSITION

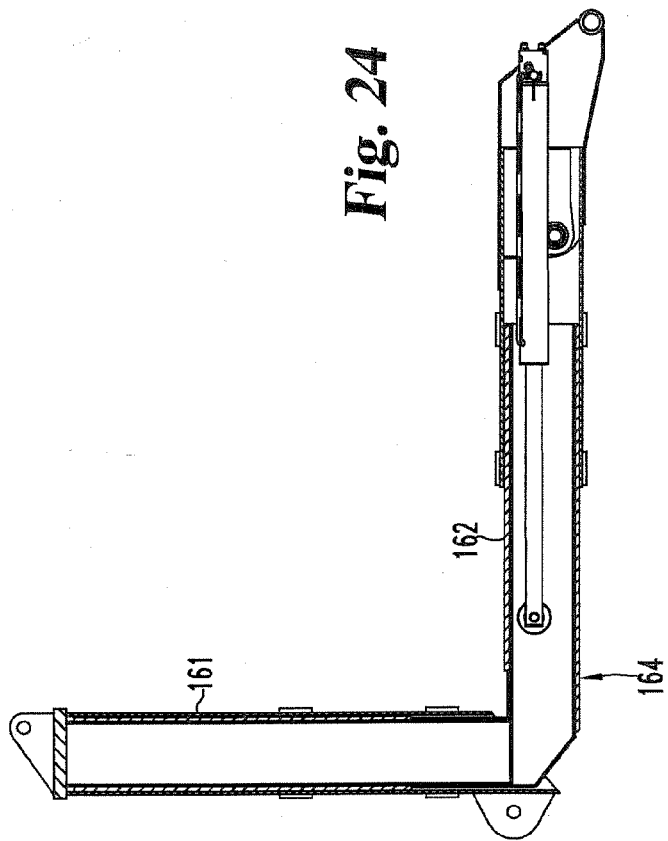
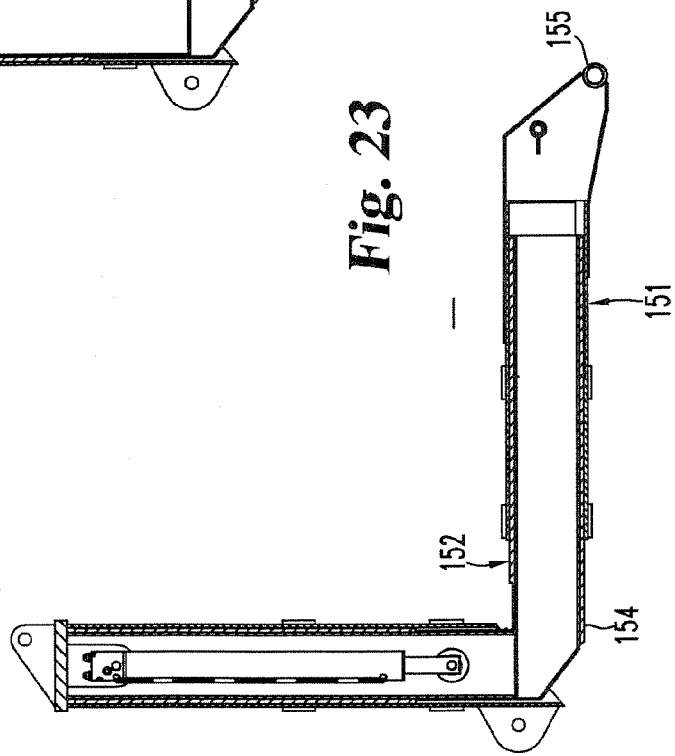

APPARATUS AND METHOD FOR LOADING, HANDLING AND TRANSPORTING WASTE CONTAINERS

CROSS REFERENCE TO RELATED APPLICATIONS

The present application is a continuation of patent application Ser. No. 12/718,921, filed Mar. 5, 2010, which application claims the benefit of U.S. Provisional Patent Application Ser. No. 61/233,489, filed Aug. 12, 2009, which applications are hereby incorporated by reference in their entirety.

FIELD OF THE INVENTION

The present invention relates to the field of transport vehicles, and more specifically, to vehicle-mounted container handlers for loading, handling and transporting waste containers.

BACKGROUND OF THE INVENTION

Front load and rear load waste containers are large receptacles designed to be transported to a site and receive solid waste materials for processing and disposal, including the diversion of wastes for recycling. When full or at designated times, a vehicle is dispatched to the site where, depending on the container and vehicle type, it either picks up and dumps the contents into its own, larger transport cavity, or it picks up the container and transports it to a remote dumping location. Improvements in the latter vehicle and means for loading, handling and transporting such containers are continually being sought.

SUMMARY OF THE INVENTION

Generally speaking, a vehicle-mounted load container handler includes carriage assembly configured for pivoting, sliding and rotating movement to grasp a waste container and lift, reposition, dump and/or transport the container.

In one embodiment, an apparatus for loading, handling and transporting waste containers includes a vehicle having a main frame and a load container handler, the load container handler including a main frame assembly having a rear end mounted to and atop the vehicle main frame; a pivot assembly pivotally connected to the main frame assembly to rotate about a first axis; a main jib assembly connected with the pivot assembly to reciprocate along a first line between jib extended and retracted positions; a carriage assembly connected with the main jib assembly to reciprocate along a second line between carriage extended and retracted positions and including container connection elements operable to rotate about a second axis and for engaging with and holding a container; and, motive elements for moving the pivot assembly, main jib assembly and carriage assembly.

It is an object of the present invention to provide an improved vehicle with load container handler for loading, handling and transporting waste containers.

Further objects and advantages of the present invention will become apparent from the following description of the preferred embodiment.

BRIEF DESCRIPTION OF THE DRAWINGS

FIG. 9 is a rear elevational view of the mast assembly 88 of the load container handler 12 of FIG. 2.

FIG. 10 is a front elevational view of the mast assembly 88 of the load container handler 12 of FIG. 2.

FIG. 11 is a top view of the mast assembly 88 of the load container handler 12 of FIG. 2.

FIG. 17 is a side, elevational view of apparatus 10 shown with a front load container 141 loaded thereon and in the travel position.

FIG. 18 is a side, elevational view of apparatus 10 shown with a rear load container 141 loaded thereon and with vertical jib assembly 62 in a raised, container adjusting position.

FIG. 19 is a side, elevational view of apparatus 10 shown with load container handler 12 articulated rearwardly for container stacking.

FIG. 20 is a side, elevational view of apparatus 10 shown with a container in the dumping position.

FIG. 23 is a side, cross-sectional view of a pivot assembly 151 and main jib assembly 154 of a load container handler 12 in accordance with another embodiment of the present invention.

FIG. 24 is a side, cross-sectional view of the vertical jib assembly 161 and main jib assembly 164 of a load container handler 12 in accordance with another embodiment of the present invention.

DESCRIPTION OF THE PREFERRED EMBODIMENT

Figure 1:
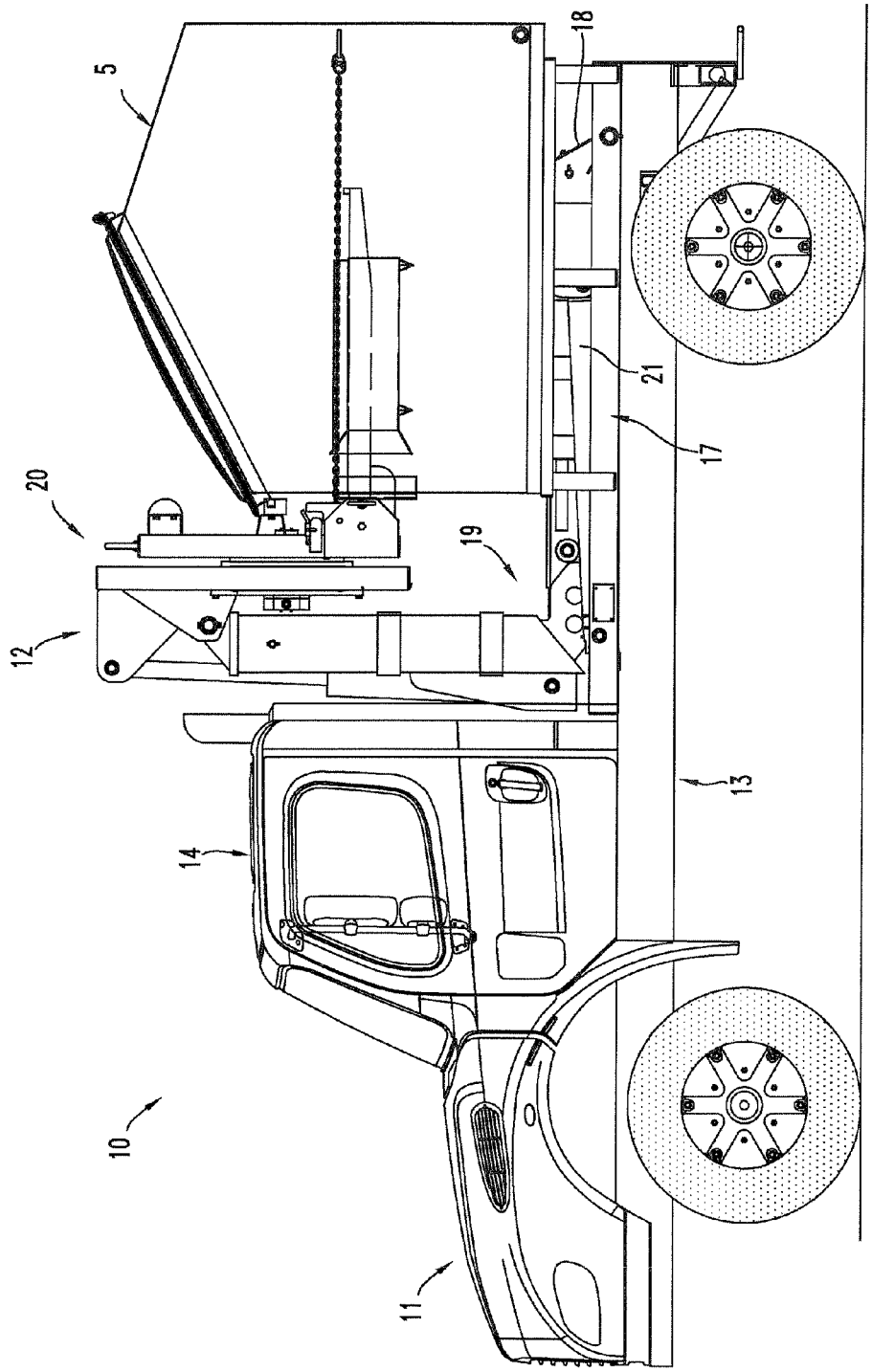
FIG. 1 is a side, elevational view of an apparatus 10 for loading, handling and transporting waste containers in accordance with one embodiment of the present invention, and showing the apparatus 10 in the transport position.

For the purposes of promoting an understanding of the principles of the invention, reference will now be made to the embodiment illustrated in the drawings and specific language will be used to describe the same. It will nevertheless be understood that no limitation of the scope of the invention is thereby intended, and any alterations and modifications in the illustrated device, and further applications of the principles of the invention as illustrated therein are herein contemplated as would normally occur to one skilled in the art to which the invention relates.

Referring to FIG. 1, there is shown an apparatus 10 for loading, handling and transporting waste containers, (such as a container 5) in accordance with one embodiment of the present invention. Apparatus 10 is particularly adapted for use with front load and rear load containers 141 and 145 (see FIGS. 17 and 18, respectively), but alternative embodiments are contemplated wherein apparatus 10 can be used to load, handle and/or transport other containers that are sized and configured for operational engagement with apparatus 10 in the same or similar manner as with the front load and rear load containers described herein. For example, ANSI Z245.60-2006 identifies one class of waste containers to which the present invention is particularly directed, that is, containers used in conjunction with mobile and stationary equipment that use mechanical means to handle the containers. As contemplated with the present invention, a vehicle mechanically engages with such containers to load (e.g. lift a container on and off the vehicle), handle (e.g. reposition a container or dump the contents of a container), and transport (e.g. move a container loaded on the vehicle from one place to another).

Figure 2:
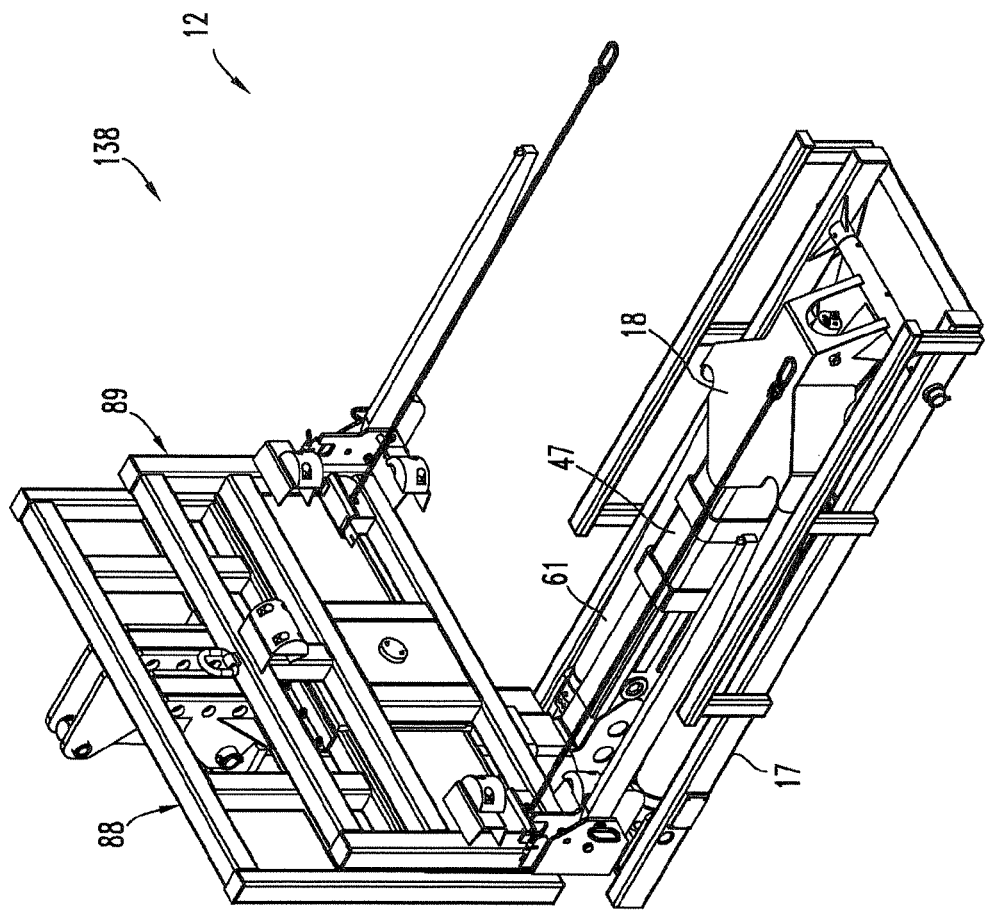
FIG. 2 is a perspective view of the load container handler 12 of the apparatus 10 FIG. 1.
Figure 6:
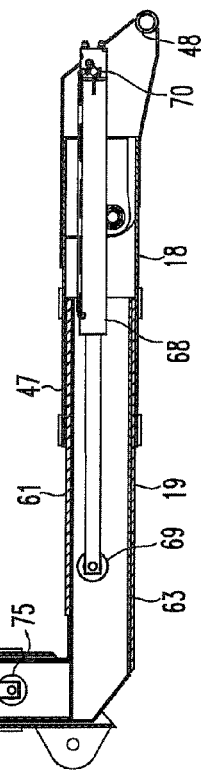
FIG. 6 is a side, cross-sectional view of the pivot assembly 18 and main jib assembly 19 of load container handler 12 of FIG. 2.
Figure 21:
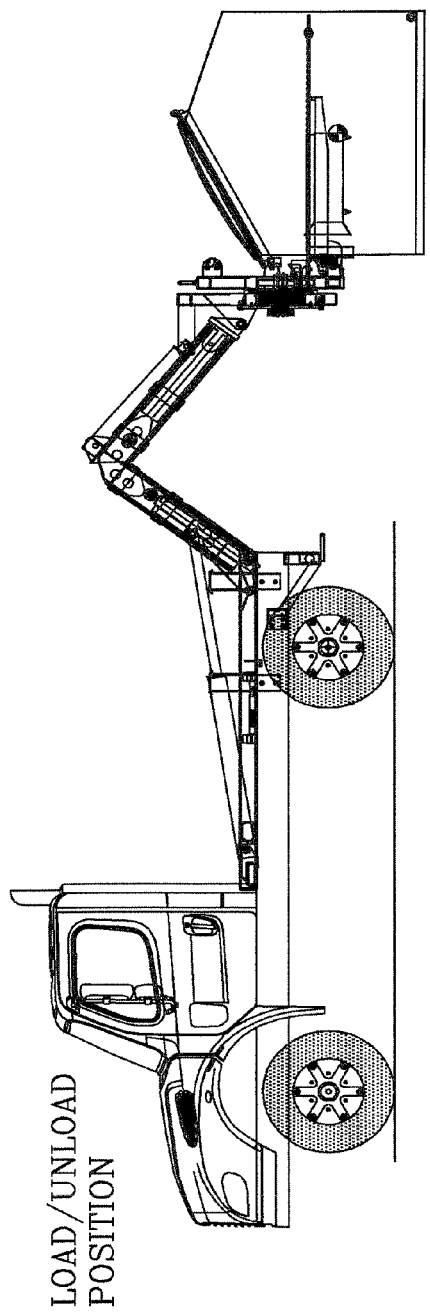
FIG. 21 is a side, elevational view of apparatus 10 shown with a container in the load/unload position.
Figure 22:
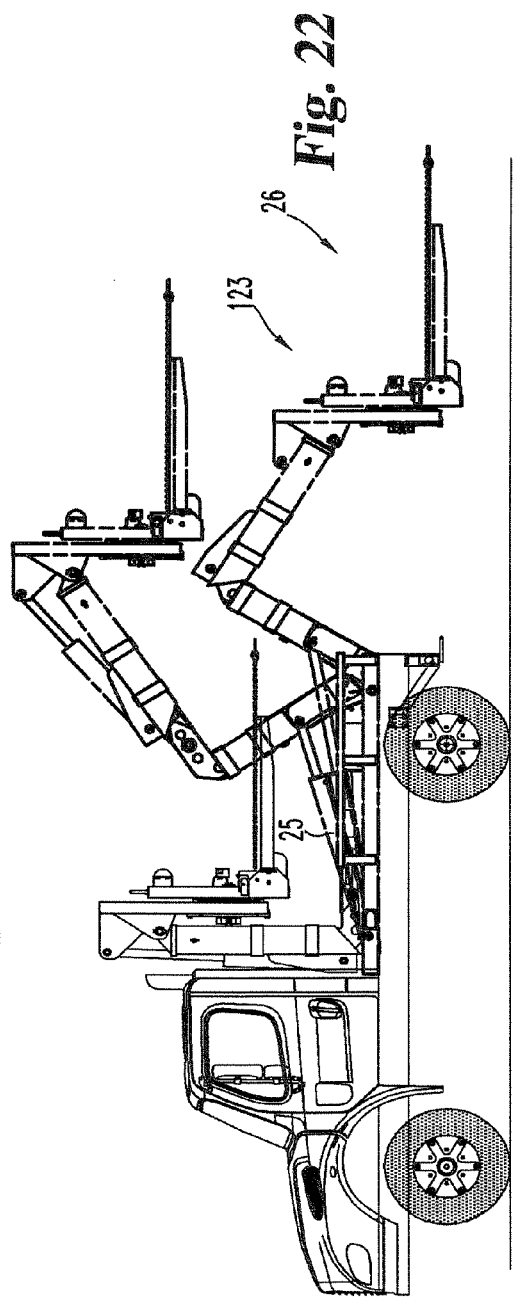
FIG. 22 is a side, elevational view of apparatus 10 shown with load container handler 12 in multiple articulated positions.

Referring to FIGS. 1 and 2, apparatus 10 generally includes a vehicle 11 and a load container handler 12. Vehicle 11 is a truck having truck main frame 13 upon which is mounted load container handler 12, rearwardly of the vehicle cab 14, in any appropriate manner, as is known in the industry. Vehicle 11 may be any appropriate moving structure including, without limitation, a trailer. Alternative embodiments are contemplated wherein the load container handler 12 may be mounted on a non-moving structure, as well, such as a loading dock or stationary platform. In the latter case, the platform can transported to a desired location, such as a loading dock, or retained temporarily atop the transport vehicle, used as intended, and then transported to another site. Load container handler 12 generally includes a main frame assembly 17, a pivot assembly 18, a main jib assembly 19, and a carriage assembly 20. Apparatus 10 also includes motive elements, which include any appropriate elements suitable for moving the aforementioned pivot assembly 18, main jib assembly 19 and carriage assembly 20 (which includes individual, movable components thereof) among the many positions described herein. For example, in one embodiment, in addition to hydraulic cylinders 68, 74 and 90 (FIGS. 5 and 6), hydraulic cylinders 21 (one shown in FIG. 1) are provided between main frame assembly 17 and pivot assembly 18 to pivot the pivot assembly 18 (and thus main jib assembly 19 and carriage assembly 20 connected therewith) relative to main frame assembly 17, between a retracted, transport position 25 (FIGS. 1 and 22) and an extended, loading position 26 (FIGS. 21 and 22). While hydraulic cylinders are shown and described, the invention contemplates any appropriate device for moving one element relative to another, such as a rack and pinion gear assembly, a linear actuator or a rotary actuator. The motive elements are also intended to include various hydraulic lines, valves, switches and other related components not shown, but well known in the art for connecting the cylinders with the power takeoff of vehicle 11 and/or with other hydraulic or appropriate power source, as is known in the art, to enable operation of load container handler 12, as described herein.

Figure 3:
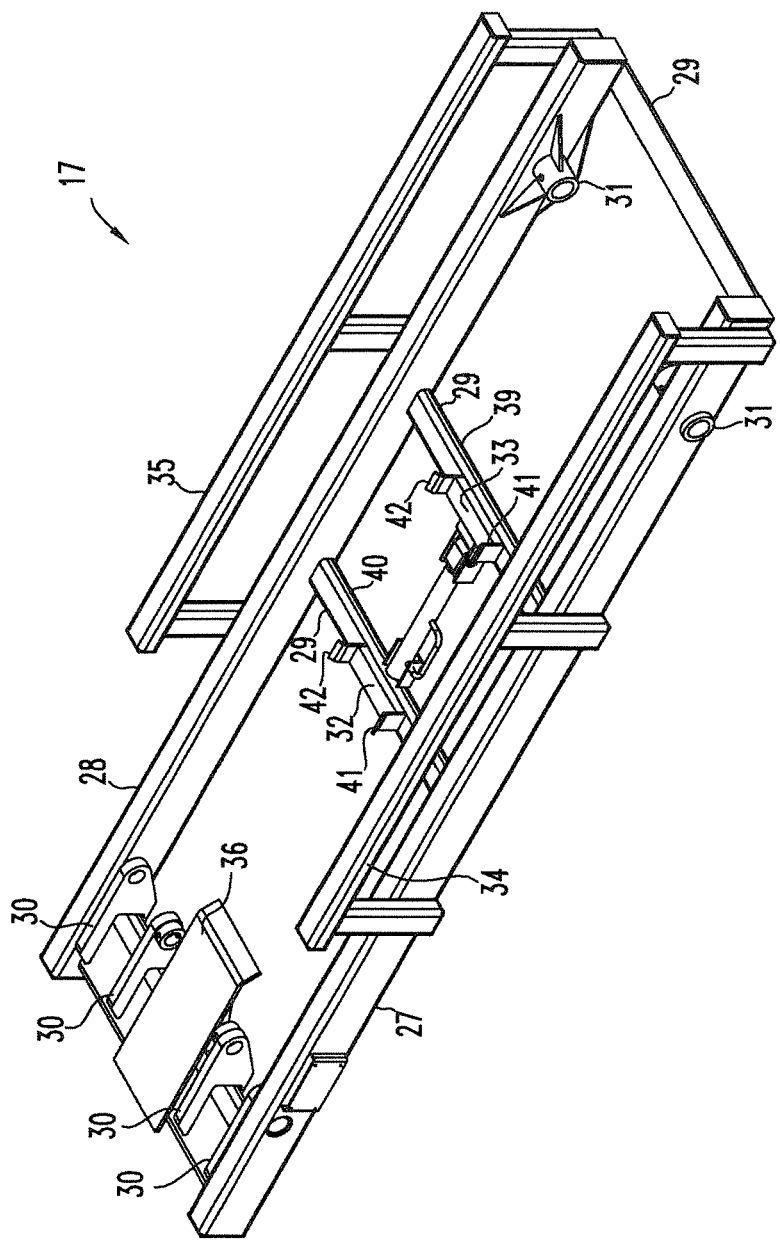
FIG. 3 is a perspective view of the main frame assembly 17 of the load container handler 12 of FIG. 2.

Referring to FIGS. 2 and 3, main frame assembly 17 includes longitudinal rails 27 and 28, various transverse stiffening members, such as at 29, four forward cylinder mounts 30, two rear pivot assembly mounts 31, central jib assembly rest brackets 32 and 33, forward jib assembly rest plate 36, and left and right container support rails 34 and 35. Support rails 34 and 35 provide a container support surface for a container placed thereon by load container handler 12. Alternative embodiments are contemplated wherein left and right container support rails 34 and 35 are nonexistent, and the container (loaded or empty) rests directly atop pivot assembly 18 and horizontal jib assembly 61. In other alternative embodiments, left and right container support rails 34 and 35 may instead or in addition comprise any appropriate structure that provides the desirable support for a container during transport. Main frame assembly 17 is secured atop truck main frame 13 in any appropriate manner such as welding and/or bolts. Central jib assembly rest brackets 32 and 33 are connected to the central transverse stiffening members 39 and 40, respectively, as shown, and each includes left and right flared jib guide fingers 41 and 42 to ensure the horizontal jib assembly 62 properly seats centrally down atop its corresponding rest bracket 32/33.

Figure 4:
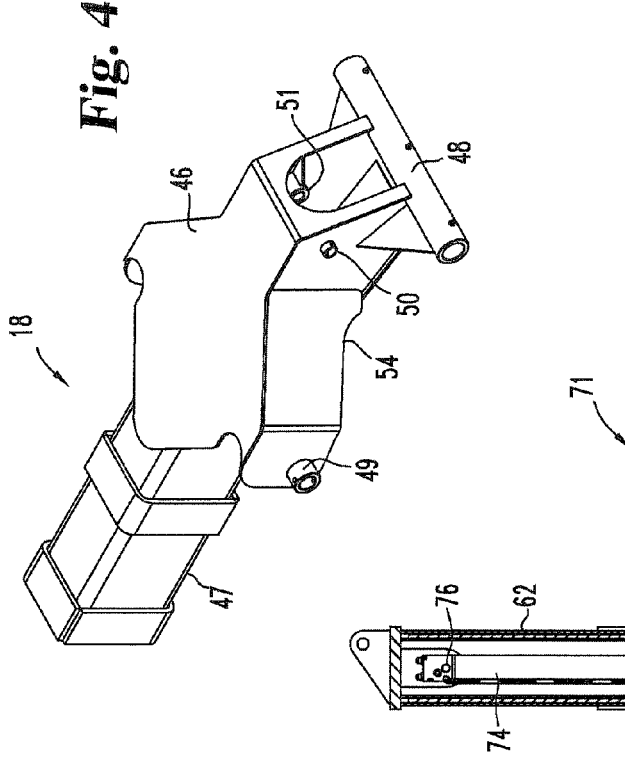
FIG. 4 is a perspective view of the pivot assembly 18 of the load container handler 12 of FIG. 2.
Figure 16:
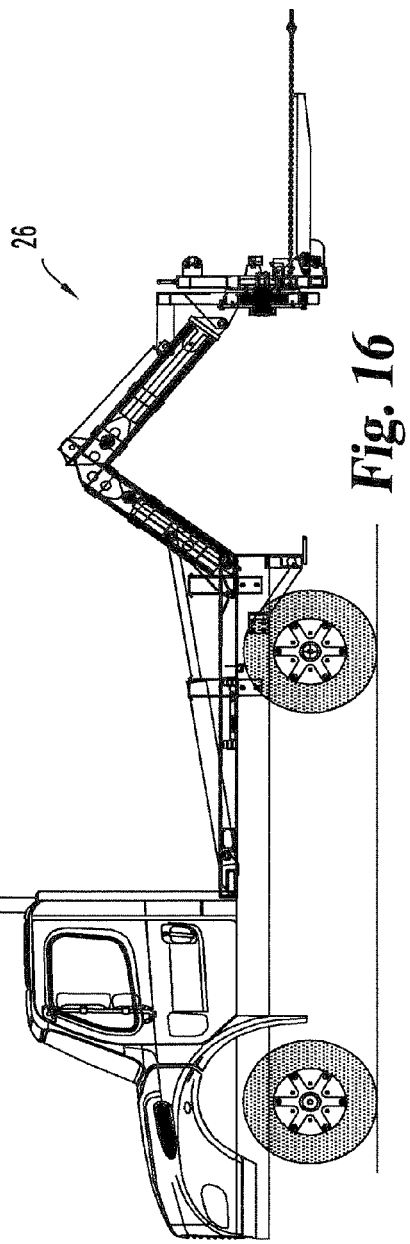
FIG. 16 is a side, elevational view of apparatus 10 shown in the container loading/unloading position.

Referring to FIGS. 2 and 4, pivot assembly 18 is a rigid, one piece unit that includes a main body 46, a rectangular cross-sectioned tube 47 extending forwardly therefrom, a pivot mounting sleeve 48 at its rear, opposing (left and right) lift cylinder mounting sleeves (one shown at 49), and opposing, internal horizontal jib cylinder mounting sleeves 50 and 51. Main body 46 defines recesses (the one on the left side of pivot assembly 18 shown at 54 sized and positioned to provide clearance for lift cylinders (the one on the left side of apparatus 10 shown at 21) when load container handler 12 is pivoted to its extended load/unload position 26 (FIGS. 16 and 22).

Figure 5:
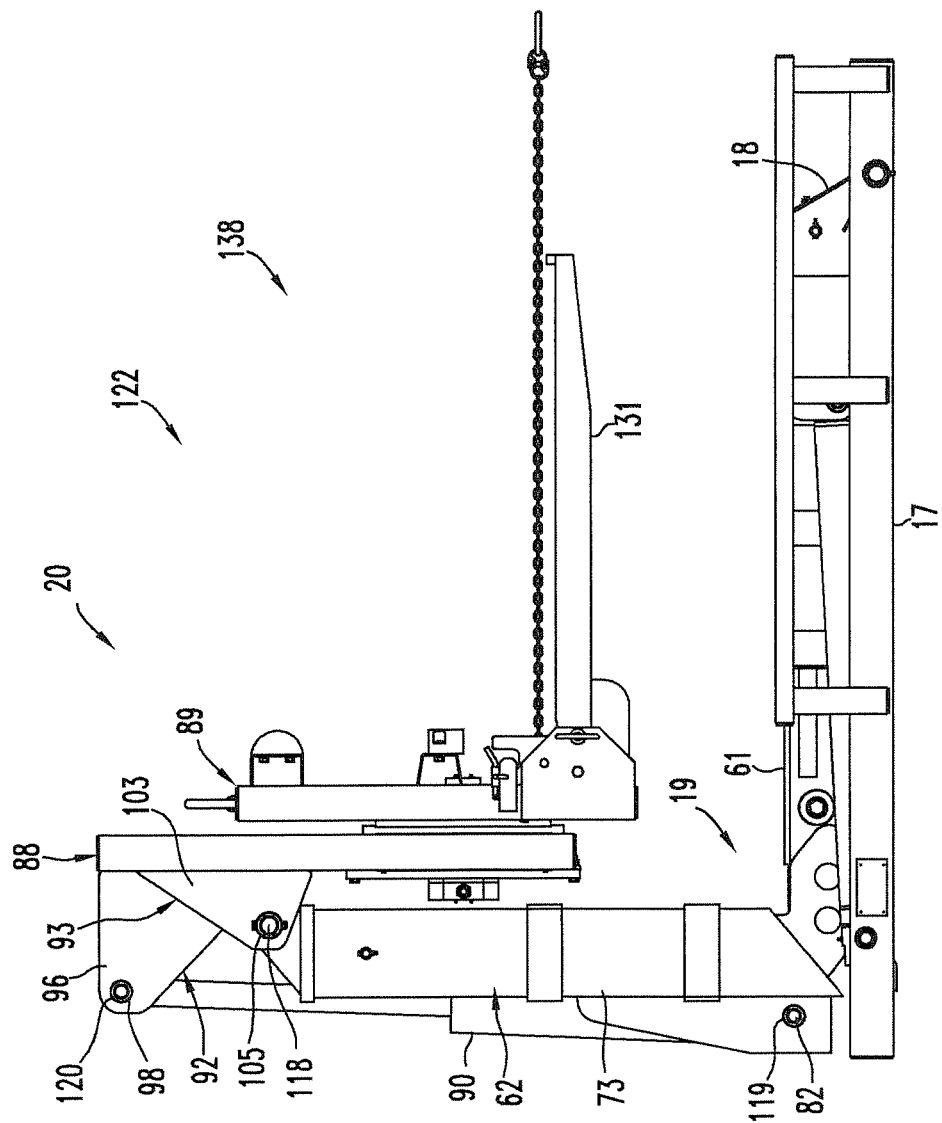
FIG. 5 is a side, elevational view of the load container handler 12 of FIG. 2.
Figure 13:
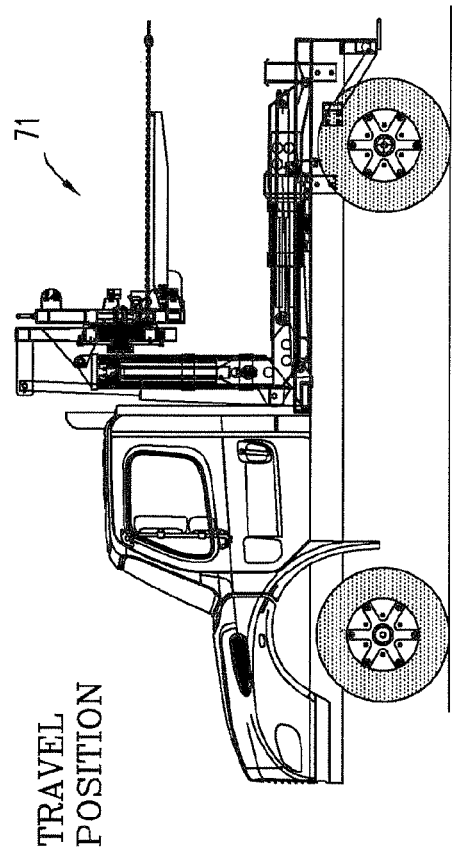
FIG. 13 is a side, elevational view of apparatus 10 shown in the travel position.
Figure 14:
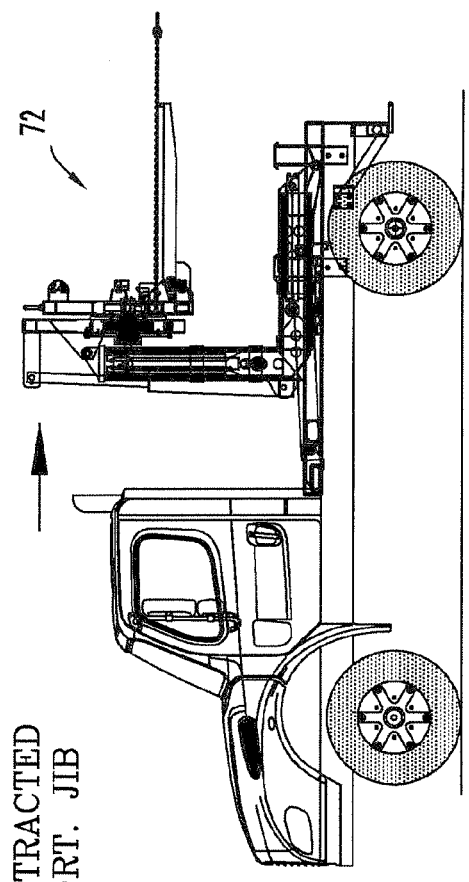
FIG. 14 is a side, elevational view of apparatus 10 shown with horizontal jib assembly 61 in the retracted position.
Figure 15:
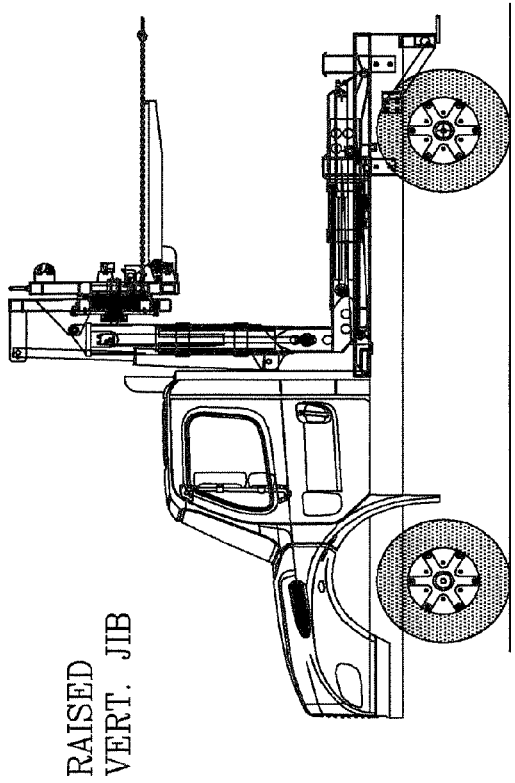
FIG. 15 is a side, elevational view of apparatus 10 shown with vertical jib assembly 62 in the raised position.

Referring to FIGS. 1-2 and 4-8, main jib assembly 19 includes horizontal jib assembly 61 and a vertical jib assembly 62. Horizontal jib assembly 61 includes an L-shaped jib with a horizontal arm 63, a vertical arm 64 and an elbow 65 rigidly connecting the two arms 63 and 64 to move together as a unit. While oriented 90 degrees from each other in the present embodiment, alternative embodiments are contemplated wherein horizontal arm 63 and vertical arm 64 are fixed to each other at an angle other than 90 degrees or their angle of connection may be selectively adjustable to accommodate a certain type of container or container handling procedure. The horizontal arm 63 of horizontal jib assembly 61 is slidably received within rectangular cross-sectioned tube 47 of pivot assembly 18. Horizontal jib assembly 61 further includes a hydraulic cylinder assembly 68 mounted between a cylinder mounting sleeve 69 of horizontal jib assembly 61 and the jib cylinder mounting sleeves 50 and 51 of pivot assembly 18 (at 70 in FIG. 6). Actuation of cylinder 68 moves horizontal jib assembly 61 along a first line between a jib extended position 71 (FIGS. 6 and 13) and a jib retracted position 72 (FIG. 14). Likewise, vertical jib assembly 62 includes a rectangular cross-sectioned tube 73 sized and configured to slidably receive vertical arm 64 of horizontal jib assembly 61 therein, and vertical jib assembly 62 also includes a hydraulic cylinder assembly 74 extending between a cylinder mounting sleeve 75 of vertical arm 64 and a jib cylinder mounting pin 76 of vertical jib assembly 62. Actuation of cylinder 74 moves vertical jib assembly 62 between a carriage extended position 77 (FIG. 18) and a carriage retracted position 78 (FIGS. 5 and 17). Vertical jib assembly 62 further includes a tilt cylinder mounting bracket 79 and a carriage assembly mounting bracket 80, both rigidly connected to tube 73. Tilt cylinder mounting bracket 79 includes tilt cylinder mounting collars 81 and 82 disposed near the bottom of tube 73, as shown. Carriage assembly mounting bracket 80 includes a carriage assembly mounting collar 83 located at the top of tube 73, as shown. Mounting collars 81, 82 and 83 are here connected with and at the bottom and top of vertical jib assembly 62, respectively, which is optimal and only means that collars 81/82 and 83 are spaced a desired distance apart. They need not be at the physically lowest (bottom) or highest (top) point of vertical jib assembly 62. Appropriate wear strips 84 or similar elements, as desired, are connected to horizontal jib assembly 61 to facilitate sliding movement between horizontal jib assembly 61 and vertical jib assembly 62 and pivot assembly 18 within which it telescopically reciprocates.

Referring to FIGS. 1, 2, 5 and 9-11, carriage assembly 20 includes a mast assembly 88, a fork assembly 89 and a tilt cylinder 90. Mast assembly 88 includes a rectangular frame 91 to which are mounted a tilt cylinder mounting bracket 92, a carriage assembly mounting bracket 93 and a fork assembly rotating mechanism 95. Tilt cylinder mounting bracket 92 comprises a pair of forwardly extending arms 96 and 97, which hold coaxial tilt cylinder mounting collars 98 and 99, as shown. Carriage assembly mounting bracket 93 likewise comprises a pair of forwardly extending arms 102 and 103, which hold carriage assembly mounting collars 104 and 105, as shown. Carriage assembly mounting collars 104 and 105 are juxtaposed lower and rearwardly of tilt cylinder mounting collars 98 and 99.

Fork assembly rotating mechanism 95 includes a central output shaft 108 that extends rearwardly from a housing 109 for connection with fork assembly 89. Rotating mechanism 95 also includes a mechanism for selectively rotating central output shaft 108. In one embodiment, the mechanism for selectively rotating central output shaft 108 (and thus fork assembly 89) includes a hydraulically driven rack a pinion arrangement (not shown) contained within housing 109.

Figure 7:
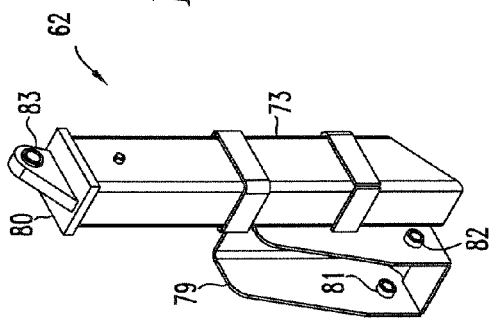
FIG. 7 is a perspective view of the vertical jib assembly 62 of the load container handler 12 of FIG. 2.
Figure 8:
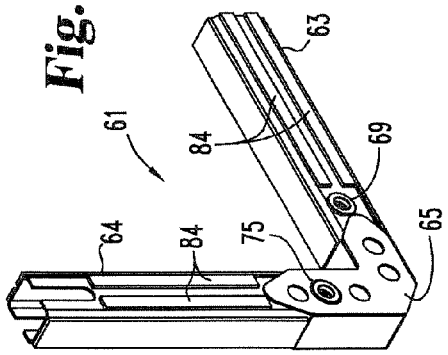
FIG. 8 is a perspective view of the horizontal jib assembly 61 of the load container handler 12 of FIG. 2.

Referring to FIGS. 5, 7 and 10, mast assembly 88 is mounted for pivotal movement to the top of the vertical jib assembly tube 73 via a pin 118 through carriage assembly mounting collars 83 and 104 and 105. Tilt cylinder 90 is pivotally mounted via pins 119 and 120 to extend between tilt cylinder mounting collars 81 and 82 at the base of the vertical jib assembly tube 73 and tilt cylinder mounting collars 98 and 99 at the top of mast assembly 88. Extension and retraction of tilt cylinder 90 pivots mast assembly 88 (and thus carriage assembly 20) between a retracted position 122 (FIG. 5) and an extended position 123 (FIG. 22). It should be noted that the extended positions of pivot assembly 18, horizontal jib assembly 61, and mast assembly 88 (all shown FIG. 22) and of vertical jib assembly 62 (as shown in FIG. 18) may extend more than is shown in those corresponding figures.

Figure 12:
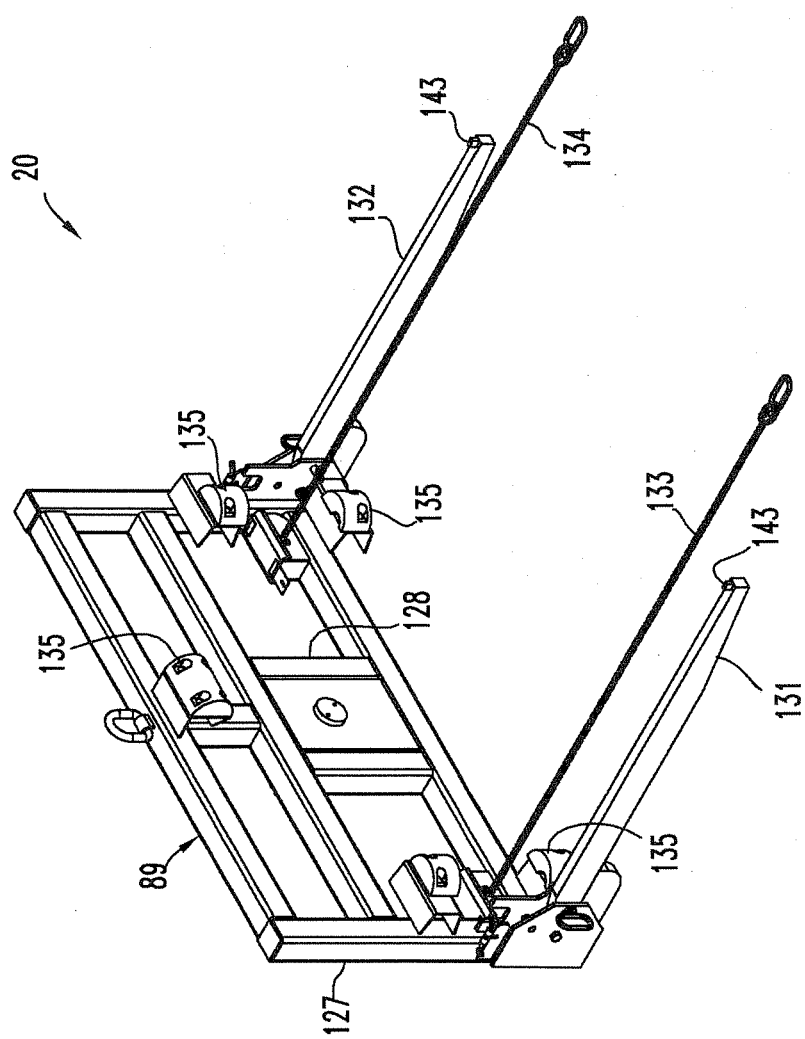
FIG. 12 is a perspective view of the fork assembly 89 of the load container handler 12 of FIG. 2.

Referring to FIGS. 2, 5 and 12, fork assembly 89 includes a rectangular frame 127 to which are mounted a fork assembly mount 128, opposing, forks 131 and 132, container retaining chains 133 and 134, and bumpers 135. Assembly mount 128 contains a collar (not shown) or any similar appropriate mechanism for fixed connection with output shaft 108 of fork assembly rotating mechanism 95 so that fork assembly 89 is juxtaposed just rearwardly of and substantially parallel to mast assembly 88 (as shown in FIGS. 1 and 5) and so that rotation of output shaft 108 rotates fork assembly 89 between a substantially zero degree resting, transport and loading position 138 (FIGS. 2 and 5) and a substantially non-zero-degree dumping position 139 (FIG. 20). In one embodiment, fork assembly 89 is configured to be rotated relative to mast assembly 88 at least 180 degrees in one direction (as shown in FIG. 20), that is, to turn a container held thereby completely upside down to dump the contents of such container.

Forks 131 and 132 are fixed to frame 127 and extend rearwardly from frame 127 at opposing sides thereof and at a distance apart that enables them to be moved along opposing sides of and engage with complementary structure on a target container, such as fork pockets (one shown at 142 on container 141) defined on the opposing sides a target container 141 (FIG. 17) or trunnion bars (discussed below). Hook points 143 are provided at the outboard ends of forks 131 and 132 to help forks 131 and 132 stay engaged with their respective fork pockets 142. Forks 131 and 132 are configured to engage with front load containers (i.e., container 141), and one or more chains (as at 133 and 134) are provided as a safety measure. The chains are connected to the fork assembly and extend rearwardly, as shown, for connection to the outboard end of one or more of the forks 131/132. In use, once a container is held by fork assembly 89, with forks 131 and 132 extending through the container fork pockets, the outer ends of the chains are connected with the outboard ends of forks 131 and 132 that extend through the ends of the container fork pockets to further protect against the container undesirably sliding off the forks 131 and 132. For rear load containers and the like (e.g., container 145 of FIG. 18), the forks move along the sides of the container and below the upper lip, trunnion bars, or other similar structure of the container, and one or more chains (not shown, but similar to chains 133 and 134) are connected with corresponding hooks 146 on the container 145 to keep the container on forks 131 and 132. Bumpers 135 cushion the container as it is engaged by load container handler 12.

Shown in FIGS. 13-22 are a variety of the available articulations of load container handler 12 to load, unload, handle and transport front and rear load containers and the like. There are, of course, an infinite number of such articulated positions between the various extended (26, 71, 77 and 123) and retracted (25, 72, 78 and 122) positions, respectively. Handling includes, among other things, lifting, stacking, dumping (as by rotating fork assembly 89 and a container held thereby, as shown in FIG. 20) and simply adjusting the position of a container.

Alternative embodiments are contemplated wherein fork assembly 89 does not rotate relative to mast assembly 88. Such embodiments contemplate using substantially the same components as those in load container handler 12, but having no fork assembly rotating mechanism 95, but instead fixedly connecting the frame 127 of fork assembly 89 to the frame 91 of mast assembly 88. Another embodiment is contemplated wherein the frames 91 and 127 are structurally merged to result in only a single frame performing all the same functions as individual frames 91 and 127 except for the rotation of fork assembly 89 relative to mast assembly 88.

Referring to FIG. 23, there is shown a pivot assembly 151 and main jib assembly 152 of a load container handler in accordance with an alternative embodiment of the present invention. This load container handler is just like the load container handler 12 of FIGS. 1-12, except that there is no hydraulic cylinder assembly 68 (FIG. 6) and, instead, the horizontal jib assembly 154 is fixedly connected with pivot assembly 151 (by any appropriate means, such as welding) and, therefore, does not extend or retract relative to pivot assembly 151. A similar alternative embodiment is contemplated wherein the horizontal jib assembly 154 and pivot assembly 151 are structurally merged, that is, comprise a single unitary jib assembly that is pivotally connected at its rear 155 to the main frame assembly 17 and performs all the same functions as the separate, telescopically reciprocating horizontal jib assembly 61 and pivot assembly 18 (of FIG. 6) except for the telescopic extension and retraction of jib assembly 61 relative to pivot assembly 18.

In similar fashion referring to FIG. 24, another embodiment of the present invention is shown wherein there is no hydraulic cylinder assembly 74 (FIG. 6), and the vertical jib assembly 161 is fixed to or manufactured as an integral, unitary part with horizontal jib assembly 162. In this embodiment, main jib assembly 164 has no vertical reciprocation through movement of a vertical jib assembly, in which case each load container handler 12 would be specifically designed for a narrower range of container sizes and configurations. That is, the load container handler 12 with vertically adjustable jib assembly 62 (FIG. 6) can accommodate a wide variety of container sizes by virtue of the vertical adjustability of its jib assembly 62. A load container handler having either or both of fixed horizontal jib assembly 154 (FIG. 23) and/or fixed vertical jib assembly 161 (FIG. 24) will, of course, be less expensive to manufacture and maintain, but will also accommodate a much narrower range of container sizes.

Alternative embodiments are contemplated wherein the load container handler 12 is mounted to a trailer or other vehicle that is towed by a truck or other similar vehicle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for loading, handling, and transporting waste containers, comprising:
    a vehicle having a main frame; and
    a container handler, the container handler comprising:
        a pivot assembly having a proximal end and a distal end, the distal end pivotally coupled with the vehicle main frame;
        a main jib assembly comprising a first arm assembly connected to a second arm assembly, the second arm assembly in sliding engagement with the pivot assembly proximal end;
        a first fluid cylinder coupled between the second arm assembly and the pivot assembly and operative to move the main jib assembly relative to the pivot assembly between an extended position and a retracted position;
        a carriage assembly pivotably coupled with the first arm assembly;
        a second fluid cylinder coupled between the first arm assembly and the carriage assembly and operative to pivot the carriage assembly relative to the first arm assembly; and
        a third fluid cylinder coupled between the first arm assembly and the second arm assembly and operative to move the first arm assembly and carriage assembly relative to the second arm assembly between an extended position and a retracted position.

2. The apparatus of claim 1, wherein the container handler further comprises a main frame assembly fixed to the vehicle main frame, and the pivot assembly is pivotally connected with the main frame assembly.

3. The apparatus of claim 1, further comprising a fourth fluid cylinder coupled between the vehicle main frame and the pivot assembly and operative to pivot the pivot assembly between an extended position and a retracted position relative to the vehicle main frame.

4. The apparatus of claim 1, wherein the first arm assembly is in sliding engagement with the second arm assembly.

5. The apparatus of claim 1, wherein the carriage assembly comprises a mast assembly and a fork assembly.

6. The apparatus of claim 5, wherein the mast assembly is pivotably coupled with the first arm assembly and the fork assembly is rotatably coupled with the mast assembly.

7. The apparatus of claim 6, wherein the pivot assembly is operative to pivot with respect to the vehicle main frame about a first axis and the fork assembly is operative to rotate with respect to the mast assembly about a second axis, and wherein the first and second axes are orthogonal.

8. The apparatus of claim 1, wherein the second arm assembly comprises a first arm disposed at a right angle to a second arm.

9. The apparatus of claim 1, wherein the first arm assembly and the second arm assembly comprise a plurality of rectangularly cross-sectioned tubes.

10. An apparatus for loading, handling, and transporting waste containers, comprising:
    a vehicle having a main frame; and
    a container handler, the container handler comprising:
        a pivot assembly having a proximal end and a distal end, the distal end pivotally coupled with the vehicle main frame;
        a main jib assembly slidably coupled with the pivot assembly proximal end, the main jib assembly comprising a first arm assembly connected to a second arm assembly;
        a first fluid cylinder coupled between the main jib assembly and the pivot assembly and operative to move the main jib assembly relative to the pivot assembly between an extended position and a retracted position;
        a mast assembly pivotably coupled with the main jib assembly;
        a fork assembly rotatably coupled with the mast assembly;
        a second fluid cylinder coupled between the main jib assembly and the mast assembly and operative to pivot the mast assembly and fork assembly relative to the main jib assembly; and
        a third fluid cylinder coupled between the first arm assembly and the second arm assembly and operative to move the first arm assembly, mast assembly, and fork assembly relative to the second arm assembly between an extended position and a retracted position.

11. The apparatus of claim 10, further comprising a fourth fluid cylinder coupled between the vehicle main frame and the pivot assembly and operative to pivot the pivot assembly between an extended position and a retracted position relative to the vehicle main frame.

12. The apparatus of claim 10, wherein the second arm assembly is in slidable engagement with the pivot assembly proximal end.

13. The apparatus of claim 10, wherein the first arm assembly is in sliding engagement with the second arm assembly.

14. The apparatus of claim 10, wherein the mast assembly is pivotably connected to the first arm assembly at a distal end of the first arm assembly, and wherein the second fluid cylinder extends between a first mounting bracket at a proximal end of the first arm assembly and a second mounting bracket coupled with the mast assembly.

15. The apparatus of claim 10, wherein the fork assembly comprises at least one fork operative to engage with a container.

16. The apparatus of claim 10, wherein the mast assembly comprises a rotatable shaft coupled with the fork assembly.

17. A container handler, comprising:
- a pivot assembly having a proximal end and a distal end, the distal end connectable with a vehicle main frame for pivotal movement with respect thereto;
- a main jib assembly comprising a first arm assembly connected to a second arm assembly, the second arm assembly in sliding engagement with the pivot assembly proximal end;
- a first fluid cylinder coupled between the second arm assembly and the pivot assembly and operative to move the main jib assembly relative to the pivot assembly between an extended position and a retracted position;
- a carriage assembly pivotably coupled with the first arm assembly;
- a second fluid cylinder coupled between the first arm assembly and the carriage assembly and operative to pivot the carriage assembly relative to the first arm assembly; and
- a third fluid cylinder coupled between the first arm assembly and the second arm assembly and operative to move the first arm assembly and carriage assembly relative to the second arm assembly between an extended position and a retracted position.

* * * * *